United States Patent [19]

Ellis-El

[11] Patent Number: 5,596,839
[45] Date of Patent: Jan. 28, 1997

[54] MODIFIED LONG TERM SELF FEEDING PLANTER

[75] Inventor: Emmanuel Ellis-El, Grand Rapids, Mich.

[73] Assignee: Robert J. Sayfie, Grand Rapids, Mich.

[21] Appl. No.: 570,650

[22] Filed: Dec. 11, 1995

[51] Int. Cl.⁶ ............................................. A01G 25/00
[52] U.S. Cl. ............................................. 47/79; 47/39
[58] Field of Search .................... 47/79 I, 79 R, 47/79 N, 65 D, 39 M, 39 R

[56] References Cited

U.S. PATENT DOCUMENTS

| | | | |
|---|---|---|---|
| 1,255,093 | 1/1918 | Harper | 47/79 R |
| 1,940,044 | 12/1933 | Brandt | 47/79 I |
| 3,243,919 | 4/1966 | Carlson | 47/79 I |
| 3,916,678 | 11/1975 | Lohoff | 47/79 I |
| 5,062,239 | 11/1991 | Helton | 47/79 R |
| 5,094,031 | 3/1992 | Lee | 47/39 M |
| 5,107,621 | 4/1992 | Deutschmann, Sr. | 47/79 I |
| 5,385,590 | 1/1995 | Sledge | 47/79 I |

FOREIGN PATENT DOCUMENTS

| | | | |
|---|---|---|---|
| 0061413 | 9/1982 | European Pat. Off. | 47/79 N |
| 1423079 | 11/1964 | France | 47/79 I |

Primary Examiner—Terry Lee Melius
Assistant Examiner—Joanne C. Downs
Attorney, Agent, or Firm—Robert J. Sayfie

[57] ABSTRACT

A planter to hold conventional plants with soil. The planter has a cavity which holds water. The water enters the soil through apertures, or a sponge, which in turn, feeds the plant. This allows the plant owner/caretaker to water the plant less often because the cavity holds enough water to feed the plant for a longer period of time that would otherwise be possible. A water level indicator allows one to view the water level, a sprayer allows one to mist the foliage, and mobility means allow, one to easily move the planter.

4 Claims, 1 Drawing Sheet

MODIFIED LONG TERM SELF FEEDING PLANTER

BACKGROUND OF THE INVENTION

1. Background—Field of the Invention

This invention relates to containers for plants. This invention holds water for a lengthy period of time and the plant(s) can "drink" the water from the soil which is moistened through water reservoirs inside the planter, via a sponge, disposed between the water and the soil, from where the plant draws its nutrients. Another version of the invention has holes instead of a sponge, or any porous material.

2. Background—Description of Related Art

There exists many types of plant holders in the public domain. There also exist planters called self watering planters (U.S. Pat. Nos. 3,903,644, 4,001,967, etc. . . ). Some of these require vacuum construction to work properly. This applicant's does not. Many of the prior patents rely on vacuum pressure to water the plants. This invention does not require vacuums. U.S. Pat. No. 4,286,408 uses a means of condensation and solar heat to water the plant(s). None of the other planters utilize a sponge to moisten the soil, as does this applicants invention.

OBJECTS AND ADVANTAGES

Accordingly, besides the objects and advantages of the self watering planter in my above patent, several objects and advantages of the present invention are:

a) to provide a planter which requires less maintenance than does a planter without the self-watering process in my invention;

b) to provide a planter with accessories like a sprayer, fertilizer, water level indicator, and mobility via wheels on the bottom.

Numerous innovations for self feeding planters have been provided in the prior art that are adapted to be used. Even though these innovations may be suitable for the specific individual purposes to which they address, they would not be suitable for the purposes of the present invention as heretofore described.

DESCRIPTION OF DRAWINGS

FIG. no. 1 is a top view of the planter utilizing a sponge to moisten the soil.

FIG. no. 2 is a side cut away view of the planter in drawing no. 1.

Figure 1:
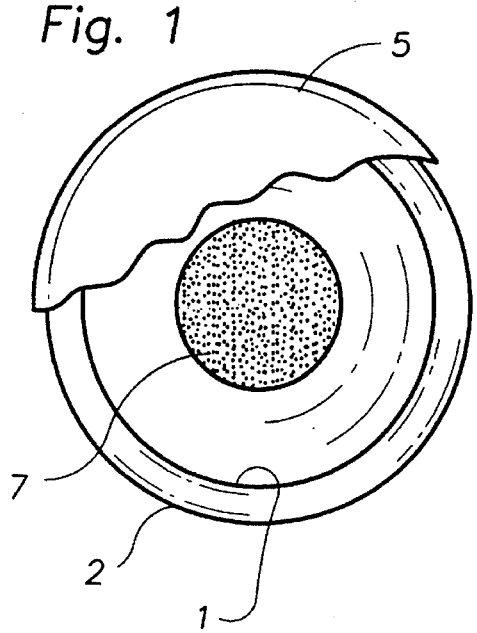

FIG. no. 3 is a top view of the planter utilizing holes to moisten the soil.

FIG. no. 4 is a side cut away view of the planter in drawing no. 3.

REFERENCE NUMERALS IN DRAWINGS

1—Upstanding inner wall.
2—Upstanding outer wall.
3—Cavity.
4—Liquid intake means.
5—Cover.
6—Hole.
7—Sponge.
8—Water level indicator.
9—Sprayer.
10—Mobility means.

DETAILED DESCRIPTION

Figure 2:
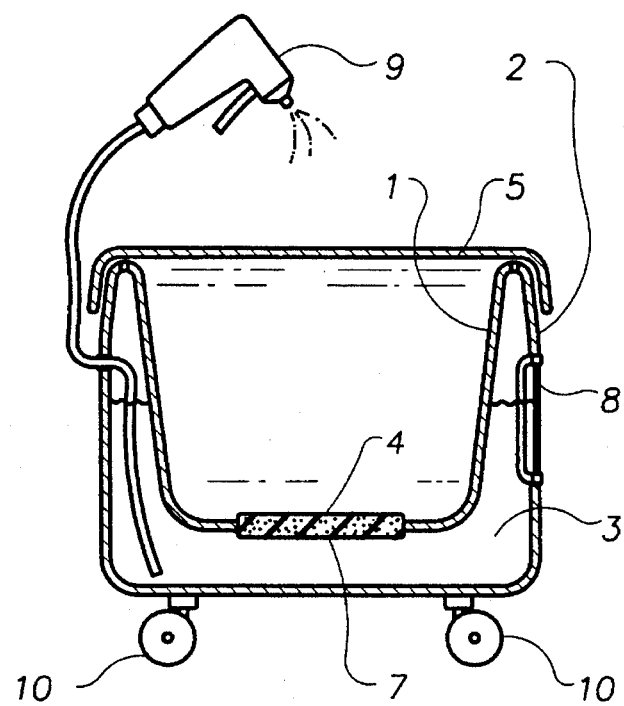
Figure 3:
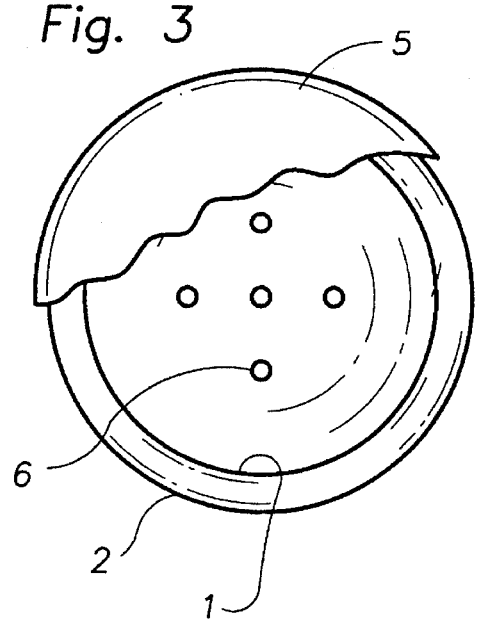

A typical embodiment of the planter is illustrated in FIG. 1 (top view) and FIG. 2 (side view). Water is contained between the upstanding inner wall (1) and the upstanding outer wall (2); the plant can then draw water through the liquid intake means, such as a sponge, this in turns moistens the dirt and sediment which the plant is resting in so the plant can absorb water and other nutrients. The planter components, upstanding inner wall (1), upstanding outer wall (2), cover (5), can be made of virtually any material, however plastic is preferred. This can be injection molded in just one operation (except for the cover).

Figure 4:
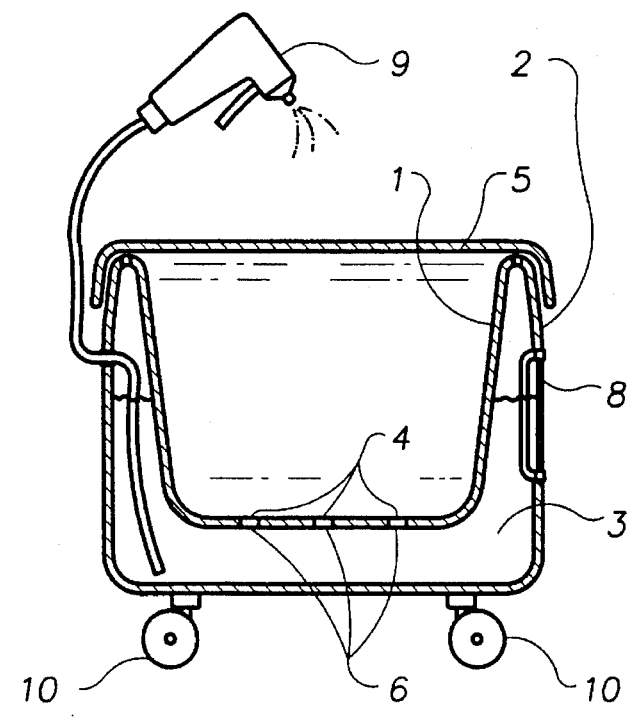

A water level indicator (8) is shown in FIGS. 2 and 4.

The modified long term self feeding planter can be moved about by a mobility means (10), including coasters and wheels. This is shown in FIGS. 2 and 4.

A sprayer (9) can be attached for misting the foliage of the plant. This is shown in FIG. 2.

The mobility means (10) is displayed in FIGS. 2 and 4.

Another embodiment uses holes (6) as the liquid intake means to get the water to the soil. The holes can be of any size that prevents amounts of soil to clog the water chamber, and still allows the soil to moisten. It is preferred that the holes have a diameter of one (1) inch or less.

SUMMARY

Accordingly, this invention allows owners to care for their plants with less time spent caring for their plants. Owners can reduce costs of florists caring for their plants. One can go on vacation and not worry about taking care of the plants. This planter can have wheels on the bottom for ease of mobility. Another object will be to have accessories on this for use in planting. A sprayer allows one to mist foliage. A transparent window allows one to view the water level.

I claim:

1. A planter comprising:

a. an upstanding inner wall (1);

b. an upstanding outer wall (2), said upstanding inner wall (1) and said upstanding outer wall (2) defining a cavity (3);

c. said inner wall (1) having a liquid intake means (4); and d. a cover (5) disposed between said upstanding inner wall (1) and said upstanding outer wall (2) to cover said cavity (3);

e. a mobility means (10) supporting the planter, whereby the planter can be rolled to different locations;

f. a water level indicator (8) disposed on said upstanding outer wall (2), said water level indicator (8) being a transparent area, whereby one can look through to see the water level;

g. a sprayer (9) disposed on the upstanding outer wall (2), whereby said sprayer (9) draws water from the cavity (3), whereby the user can spray the plant.

2. A planter as described in claim 1 wherein said liquid intake means comprises a hole (6).

3. A planter as described in claim 1 wherein said liquid intake means comprises a sponge (7).

4. A planter as described in claim 1 wherein said mobility means comprises a coaster.

* * * * *